United States Patent
Min et al.

(10) Patent No.: US 11,851,021 B2
(45) Date of Patent: Dec. 26, 2023

(54) AIRBAG OF SUNROOF FOR VEHICLE

(71) Applicants: HYUNDAI MOBIS CO., LTD., Seoul (KR); INALFA ROOF SYSTEMS KOREA LTD., Hwaseong-si (KR)

(72) Inventors: Byung Ho Min, Yongin-si (KR); Dong Oh Lee, Yongin-si (KR); Kwang Won Seo, Seoul (KR); Sang Gi Jang, Pyeongtaek-si (KR)

(73) Assignees: HYUNDAI MOBIS CO., LTD., Seoul (KR); INALFA ROOF SYSTEMS KOREA, LTD., Hwaseong-si (KR)

( * ) Notice: Subject to any disclaimer, the term of this patent is extended or adjusted under 35 U.S.C. 154(b) by 0 days.

(21) Appl. No.: 17/192,246

(22) Filed: Mar. 4, 2021

(65) Prior Publication Data
US 2021/0276507 A1   Sep. 9, 2021

(30) Foreign Application Priority Data
Mar. 6, 2020   (KR) ................ 10-2020-0028559

(51) Int. Cl.
 *B60R 21/214*   (2011.01)
 *B60R 21/213*   (2011.01)

(52) U.S. Cl.
 CPC .................. *B60R 21/214* (2013.01)

(58) Field of Classification Search
 CPC ............... B60R 21/213; B60R 21/214; B60R 2021/0253; B60R 2021/23192
 See application file for complete search history.

(56) References Cited

U.S. PATENT DOCUMENTS

| | | | |
|---|---|---|---|
| 6,189,960 B1 * | 2/2001 | Mumura | B60J 7/0015 160/7 |
| 6,241,278 B1 * | 6/2001 | Roote | B60R 21/213 280/728.2 |
| 6,502,854 B2 * | 1/2003 | Mueller | B60R 21/201 180/281 |
| 6,971,704 B2 * | 12/2005 | Cocaign | B62D 25/06 296/215 |
| 8,845,013 B2 * | 9/2014 | Lee | B60J 1/2019 296/214 |
| 9,004,526 B2 * | 4/2015 | Fukawatase | B60R 21/207 280/730.1 |
| 9,610,915 B2 * | 4/2017 | Specht | B60R 21/214 |
| 9,771,048 B2 * | 9/2017 | Min | B60R 21/214 |
| 9,994,182 B1 * | 6/2018 | Jaradi | B60R 21/232 |
| 10,391,967 B2 * | 8/2019 | Lee | B60R 21/233 |
| 10,427,637 B2 * | 10/2019 | Raikar | B60J 7/02 |
| 10,471,924 B2 * | 11/2019 | Min | B60R 21/233 |
| 10,625,705 B2 * | 4/2020 | Min | B60R 21/23 |
| 10,933,833 B2 * | 3/2021 | Park | B60R 21/214 |
| 11,014,523 B2 * | 5/2021 | Min | B60R 21/2176 |
| 11,186,246 B2 * | 11/2021 | Min | B60R 21/2338 |

(Continued)

FOREIGN PATENT DOCUMENTS

KR   2019-0007291   1/2019

*Primary Examiner* — Barry Gooden, Jr.
(74) *Attorney, Agent, or Firm* — DLA Piper LLP (US)

(57) ABSTRACT

An airbag of a sunroof for a vehicle is proposed. The airbag includes: a roof panel for a vehicle with the sunroof; an airbag module positioned at a lower portion of the roof panel and securely coupled to the roof panel; and a head lining positioned while being spaced downward from the roof panel, and fixed to a lower portion of the airbag module.

7 Claims, 5 Drawing Sheets

(56) References Cited

U.S. PATENT DOCUMENTS

| | | | |
|---|---|---|---|
| 2005/0040627 A1* | 2/2005 | DePottey | B60R 21/214 |
| | | | 280/730.1 |
| 2005/0040667 A1* | 2/2005 | Schneider | B60R 21/214 |
| | | | 296/97.12 |
| 2010/0327567 A1* | 12/2010 | Choi | B60R 21/2176 |
| | | | 280/730.2 |
| 2014/0097601 A1* | 4/2014 | Fukawatase | B60R 21/207 |
| | | | 280/730.2 |
| 2018/0162315 A1* | 6/2018 | Lee | B60R 21/231 |
| 2018/0265029 A1* | 9/2018 | Min | B60R 21/233 |
| 2018/0312130 A1* | 11/2018 | Min | B60R 21/13 |
| 2019/0016292 A1* | 1/2019 | Son | B60R 21/233 |
| 2019/0184927 A1* | 6/2019 | Park | B60R 21/213 |
| 2019/0184930 A1* | 6/2019 | Min | B60R 21/2176 |
| 2019/0366968 A1* | 12/2019 | Park | B60R 21/214 |
| 2021/0179003 A1* | 6/2021 | Min | B60R 21/213 |
| 2023/0024300 A1* | 1/2023 | Gould | B60R 21/214 |
| 2023/0060876 A1* | 3/2023 | Gould | B60R 21/217 |

* cited by examiner

AIRBAG OF SUNROOF FOR VEHICLE

CROSS REFERENCE TO RELATED APPLICATION

The present application claims priority to Korean Patent Application No. 10-2020-0028559, filed Mar. 6, 2020, the entire contents of which is incorporated herein for all purposes by this reference.

BACKGROUND OF THE INVENTION

Field of the Invention

The present invention relates generally to an airbag of a sunroof for a vehicle and, more particularly, to an airbag applied to a vehicle in which a sunroof is installed.

Description of the Related Art

An airbag for a vehicle is a safety device that mitigates an impact on occupants by deploying an airbag cushion when a collision occurs, and includes may types such as a driver airbag (DAB), a passenger airbag (PAB), a side airbag (SAB), a curtain airbag (CAB), a knee airbag (KAB), a roof airbag (RAB), etc.

A vehicle having a panoramic roof structure is more easily damaged than a vehicle having a non-panoramic roof structure, and an occupant may be further injured or ejected from the vehicle due to roof damage.

In order to prevent such problems, a sunroof airbag that is deployed to correspond to a sunroof is installed in a roof of the vehicle.

However, when the sunroof is formed in a curved shape rather than a linear shape, there is need for guiding the airbag of the sunroof to be deployed while corresponding to the sunroof.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to propose an airbag of a sunroof for a vehicle, wherein an airbag module is mounted on a roof panel of the vehicle and a head lining is mounted on a lower portion of the airbag module to protect an occupant when the sunroof of the vehicle is damaged.

In order to achieve the above objective, according to one aspect of the present invention, there is provided an airbag of a sunroof for a vehicle, the airbag including: a roof panel for a vehicle in which the sunroof is installed; an airbag module positioned at a lower portion of the roof panel and securely coupled to the roof panel; and a head lining positioned while being spaced downward from the roof panel, and fixed to a lower portion of the airbag module.

The airbag module may include: an airbag plate coupled to a first side of the roof panel such that a gap is defined between the airbag plate and the roof panel; and an airbag cushion positioned in the gap between the airbag plate and the roof panel, the airbag cushion being configured to be deployed toward a second side of the roof panel, thereby coveting the sunroof during deployment.

The airbag module may include: an inflator positioned at a side, which is opposite to a deployment direction of the airbag cushion, in the gap between the airbag plate and the sunroof, the inflator being configured to inject gas into the airbag cushion to deploy the airbag cushion.

The airbag module may include: a bracket extending upward from the airbag plate and coupled to both the roof panel and the airbag plate.

The airbag module may include: a mounting portion mounted on a lower side of the airbag plate, wherein the head lining may include: a coupling portion connected to an upper surface of the head lining and coupled to the mounting portion at a position corresponding to the mounting portion.

The coupling portion of the head lining may be formed in a deformable form of a clip, and when the coupling portion is inserted into the mounting portion, the coupling portion may be locked to the mounting portion and the coupling portion may be prevented from being separated from the mounting portion in a reverse direction.

An end of the head lining may be bent upward and cover an outer surface of the airbag module.

The head lining may be configured to be deformed such that an end thereof may move downward due to deployment pressure generated when the airbag cushion is deployed, and the airbag cushion may be configured to be deployed into a space between the end of the head lining and the roof panel.

In the airbag of a sunroof fora vehicle according to the present invention, the airbag cushion, the inflator, the mounting portion, and the bracket are coupled to the airbag plate to be modularized, the airbag module is mounted on the roof panel, and the airbag module is mounted to the roof of the vehicle as the airbag module is coupled to the head lining by coupling the coupling portion of the head lining to the mounting portion of the airbag module.

Accordingly, when the sunroof is damaged, the airbag module is deployed to prevent injuries to an occupant due to damage of the sunroof.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF THE INVENTION

Figure 1:
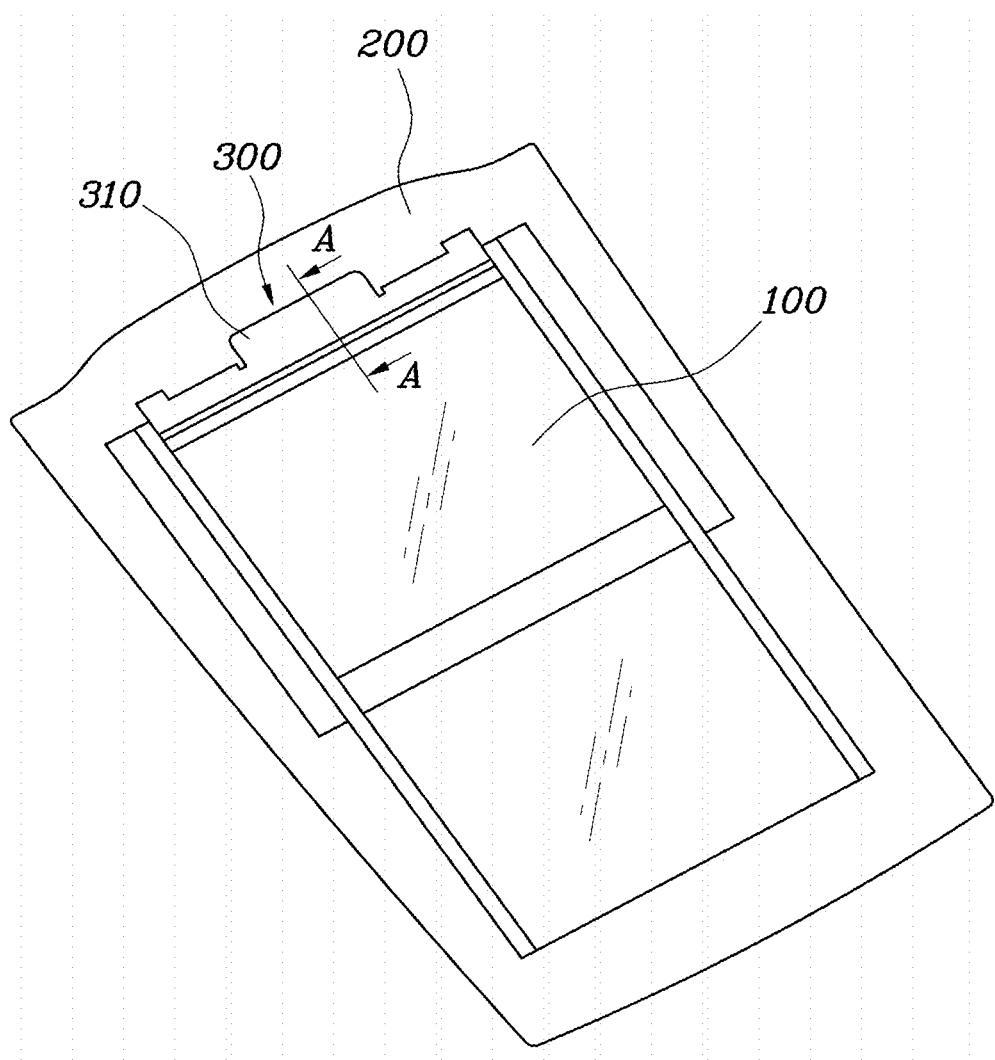
FIG. 1 is a perspective view showing an airbag of a sunroof for a vehicle according to an embodiment of the present invention.

In the following description, the structural or functional description specified to exemplary embodiments according to the concept of the present invention is intended to describe the exemplary embodiments, so it should be understood that the present invention may be variously embodied, without being limited to the exemplary embodiments.

An embodiment described herein may be changed in various ways and various shapes, so specific embodiments are shown in the drawings and will be described in detail in this specification. However, it should be understood that the exemplary embodiments according to the concept of the present invention are not limited to the embodiment which will be described hereinbelow with reference to the accompanying drawings, but all of modifications, equivalents, and substitutions are included in the scope and spirit of the invention.

It will be understood that although the terms first and/or second, etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent" or "directly adjacent" should be interpreted in the same manner as those described above.

The terminology used herein is for the purpose of describing a particular embodiment only and is not intended to limit the present invention. Singular forms are intended to include plural forms unless the context dearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present invention belongs. It must be understood that the terms defined by the dictionary are identical with the meanings within the context of the related art, and they should not be ideally or excessively formally defined unless the context clearly dictates otherwise.

Hereinbelow, an exemplary embodiment of the present invention will be described in detail with reference to the accompanying drawings. Like reference numerals are used to identify like components throughout different drawings.

Figure 2:
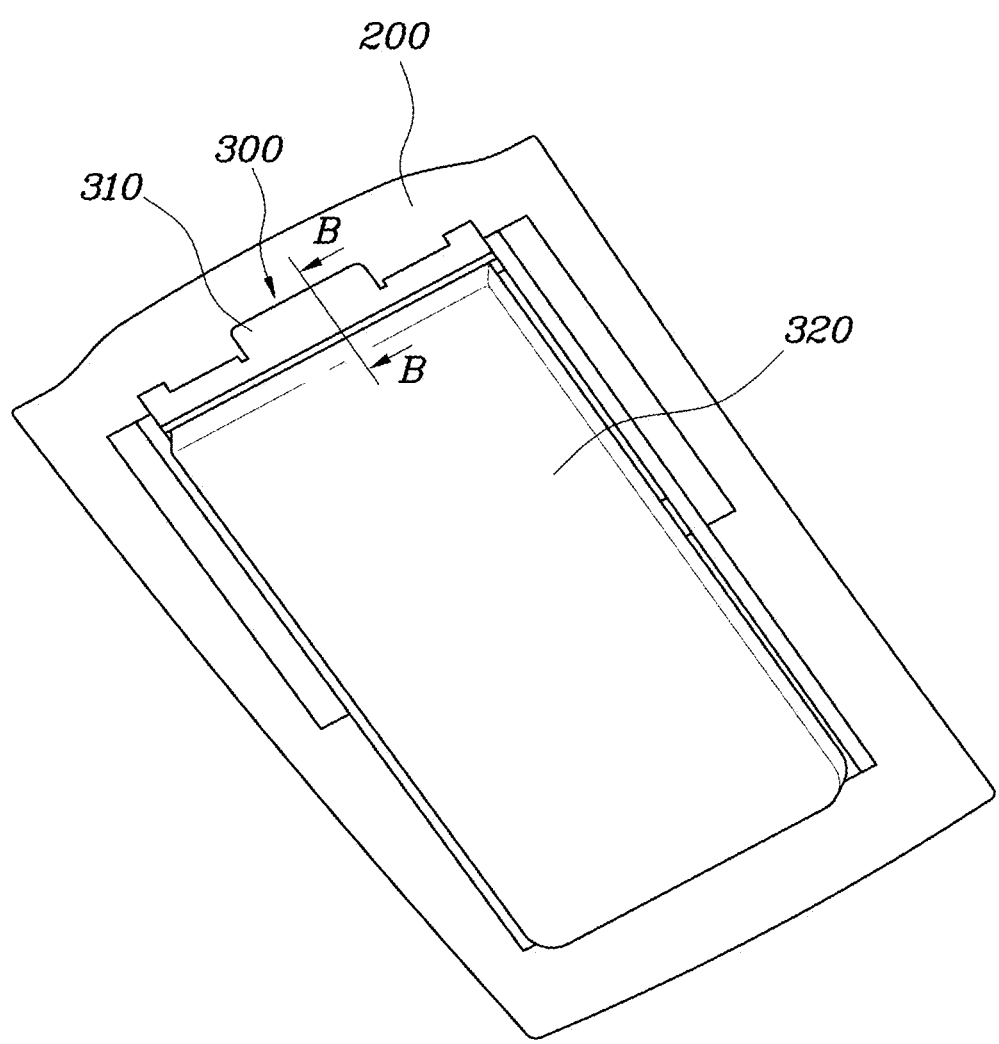
FIG. 2 is a perspective view showing the airbag of the sunroof fora vehicle during the deployment according to the embodiment of the present invention.
Figure 3:
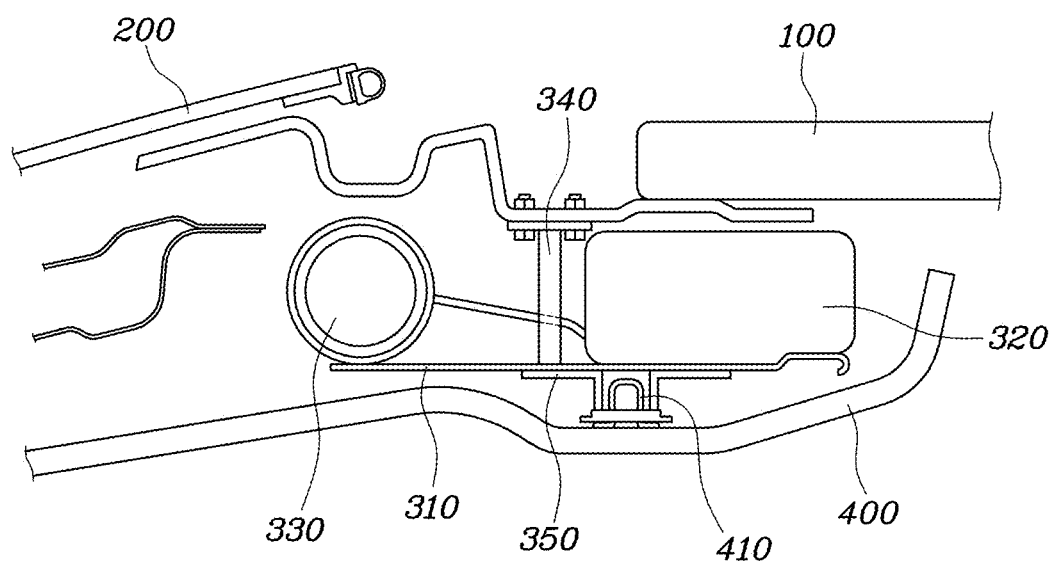
FIG. 3 is a sectional view taken along line A-A in FIG. 1.
Figure 4:
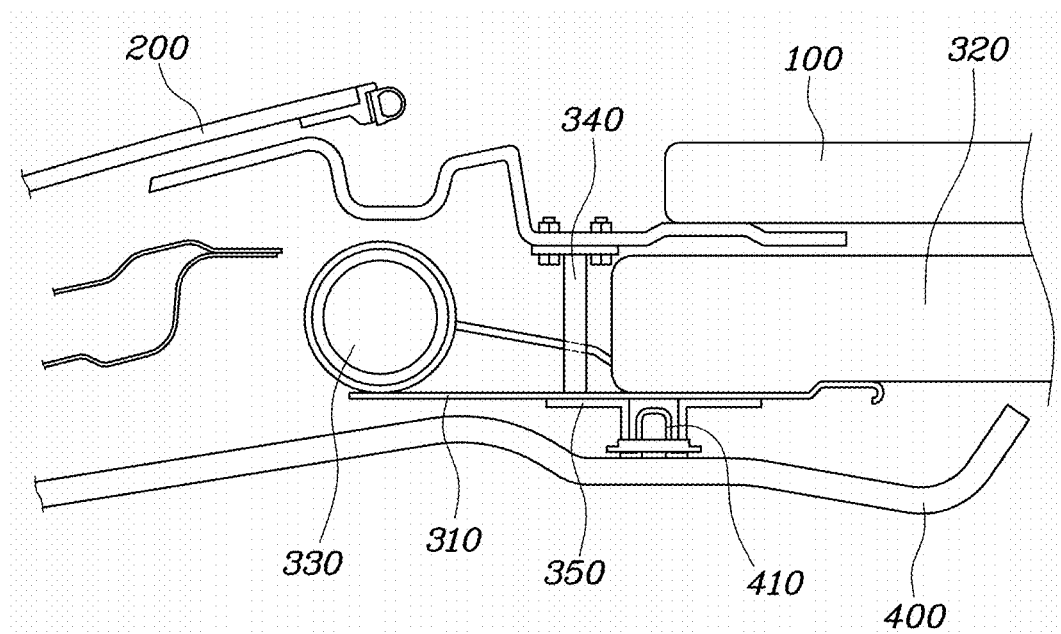
FIG. 4 is a sectional view taken along line B-B in FIG. 2.
Figure 5:
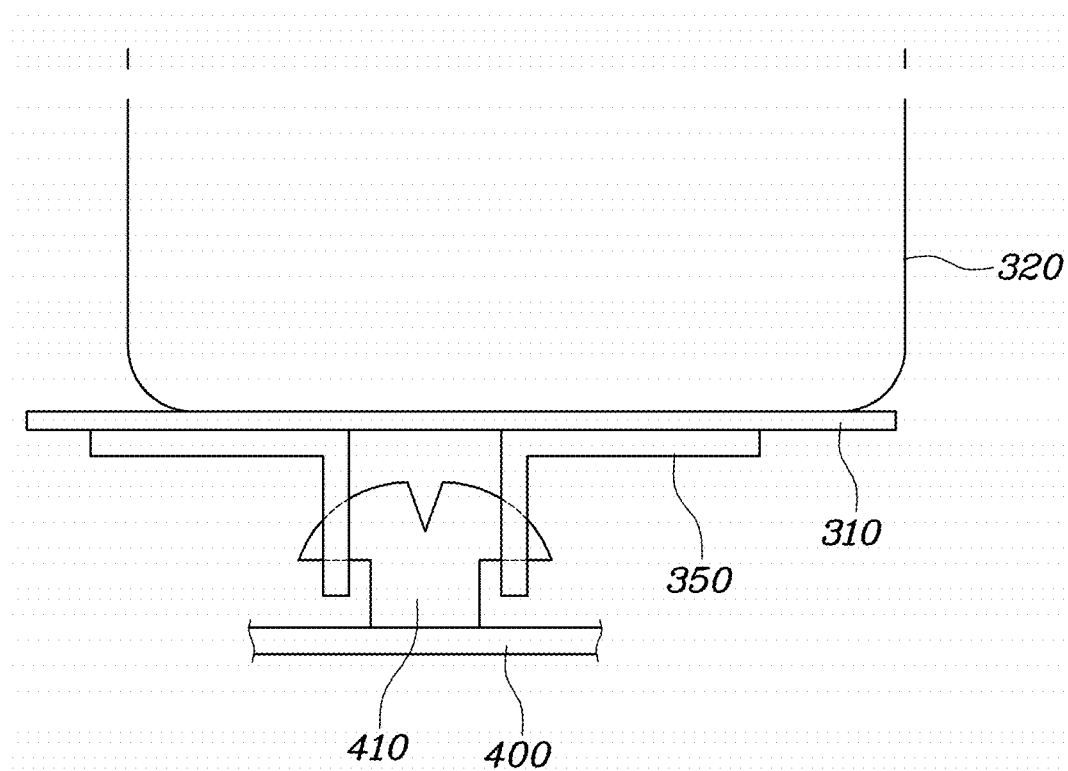
FIG. 5 is a front view showing a mounting portion and a coupling portion in the structure of the airbag of the sunroof for a vehicle according to the embodiment of the present invention.

FIG. 1 is a perspective view showing an airbag of a sunroof for a vehicle according to an embodiment of the present invention. FIG. 2 is a perspective view showing the airbag of the sunroof fora vehicle during the deployment according to the embodiment of the present invention. FIG. 3 is a sectional view taken along line A-A in FIG. 1. FIG. 4 is a sectional view taken along line B-B in FIG. 2. FIG. 5 is a front view showing a mounting portion 350 and a coupling portion 410 in the structure of the airbag of the sunroof for a vehicle according to the embodiment of the present invention.

Hereinbelow, the airbag of the sunroof for a vehicle according to the embodiment of the present invention will be described with reference to FIGS. 1 to 5.

In a vehicle with the sunroof 100, a roof panel 200 of a vehicle is mounted with a space in which the sunroof 100 is placed. The sunroof 100 is made of glass, so the sunroof 100 is more likely to be damaged than a steel roof panel 200 and causes injuries to occupants due to damaged glass during a vehicle collision.

According to the present invention, the airbag of the sunroof for a vehicle is configured such that an airbag module 300 is mounted to the roof panel 200 of a vehicle and a head lining 400 of a vehicle is mounted to the airbag module 300. Accordingly, the airbag of the sunroof fora vehicle may be deployed to prevent the occupants from being injured due to the damaged sunroof 100 of a vehicle during the vehicle collision.

In detail, the airbag of the sunroof fora vehicle according to of the present invention includes: the roof panel 200 of the vehicle in which the sunroof 100 is installed; the airbag module 300 positioned at a lower portion of the roof panel 200 and securely coupled to the roof panel 200; and the head lining 400 positioned while being spaced downward from the roof panel 200 and fixed to a lower portion of the airbag module 300.

Conventionally, the head lining 400 is configured to be directly connected to the roof panel 200 via a bracket 340, so there is a lack of space to place the airbag on the roof panel 200 of the sunroof 100 for a vehicle.

Referring to FIG. 3, the airbag module 300 is coupled to a lower surface of the roof panel 200 of the vehicle and the head lining 400 is mounted to a lower surface of the airbag module 300. Whereby, the airbag of the sunroof for a vehicle may be mounted on the roof panel 200.

Therefore, a gap is defined between the head lining 400 and the roof panel 200, and the airbag module 300 may be mounted in the gap.

According to the present invention, the airbag of the sunroof for a vehicle is mounted on the front of the roof panel 200, but may be mounted on the side or rear of the roof panel 200. However, a vehicle collision frequently occurs in the front of a vehicle, and furthermore, the sunroof 100 may be provided over the entire roof panel 200 or may be provided in the front of the roof panel 200. Therefore, it is preferable that the airbag module 300 is mounted on the front of the roof panel 200 as described in the embodiment of the present invention.

Accordingly, in a situation where there is risk of damage to the sunroof 100 of a vehicle, such as a collision or a rollover accident of a vehicle, the airbag cushion 320 may be deployed from the airbag module 300 and may be deployed to a position corresponding to the sunroof 100. Accordingly, the occupants may be prevented from being injured due to damage to the sunroof 100.

The airbag module 300 includes: an airbag plate 310 coupled to a first side of the roof panel 200 such that a gap is defined between the airbag plate and the roof panel 200; and an airbag cushion 320 positioned in the gap between the airbag plate 310 and the roof panel 200 and configured to be deployed toward a second side of the roof panel 200 to cover the sunroof 100 during deployment.

In the airbag module 300, the airbag plate 310 is positioned such that the gap is defined below the lower surface of the roof panel 200 and the airbag cushion 320 is mounted between the airbag plate 310 and the roof panel 200. That is, a space in which the airbag cushion 320 is placed may be formed.

The airbag cushion 320 may be mounted on the roof panel 200 or the airbag plate 310 in the gap between the airbag plate 310 and the roof panel 200. However, as the airbag cushion 320 is mounted on the airbag plate 310 as a component of the airbag module 300 and is mounted on the roof panel 200, the vehicle manufacturing process may be simplified.

The airbag plate 310 provides the space in which the airbag cushion 320 is placed, and may prevent the airbag cushion 320 from being damaged in an un-deployed state of the airbag cushion 320.

During deployment, the airbag cushion 320 may be deployed to correspond to the sunroof 100 in the interior of the vehicle. Furthermore, the airbag cushion 320 may prevent the occupants from being injured due to the debris of the damaged sunroof 100.

The airbag module 300 includes an inflator 330 which is positioned at one side of the gap between the airbag plate 310 and the sunroof 100 in a direction opposite to a deployment direction of the airbag cushion 320, and is configured to inject gas into the airbag cushion 32 to deploy the airbag cushion 320.

In order to deploy the airbag cushion 320, the inflator 330 is mounted in the airbag module 300. In the embodiment of the present invention, the inflator 330 may be positioned in the gap between the airbag plate 310 and the roof panel 200.

The inflator 330 is connected to the airbag cushion 320, and is configured to deploy the airbag cushion 320 by injecting gas into the airbag cushion 320 when a vehicle collision sensor is operated.

The inflator 330 may be mounted to the airbag plate 310 or the roof panel 200 in the gap between the airbag plate 310 and the roof panel 200. However, the vehicle manufacturing process may be simplified by modularization in which the inflator is mounted to the airbag plate 310 with the airbag cushion 320 and by mounting the airbag module 300 on the roof panel 200.

The airbag module 300 includes the bracket 340 that extends upward from the airbag plate 310 and is coupled to both the roof panel 200 and the airbag plate 310.

In order to mount the airbag plate 310 to the roof panel 200, the bracket 340 may be formed on an upper surface of the airbag plate 310 and may be coupled to the roof panel 200.

The airbag module 300 is modularized by coupling the airbag cushion 320, the inflator 330, and the bracket 340 to the airbag plate 310, and the airbag module 300 is coupled to the roof panel 200 via the bracket 340. Accordingly, the vehicle manufacturing process may be simplified.

Furthermore, the bracket 340 securely couples the airbag module 300 to the roof panel 200 by various coupling method such as bolting, so that the airbag module 300 may be positioned on the lower surface of the roof panel 200 of the vehicle.

The airbag module 300 includes the mounting portion 350 mounted to a lower side of the airbag plate 310. The head lining 400 includes the coupling portion 410, which is connected to an upper surface of the head lining 400 and is coupled to the mounting portion 350 at a position corresponding to the mounting portion 350.

The mounting portion 350 provided for mounting the head lining 400 is formed on a lower surface of the airbag plate 310, and the coupling portion 410 mounted to the head lining 400 is formed on a position of an upper surface of the head lining 400, the position corresponding to a position of the mounting portion 350. Accordingly, the head lining 400 may be positioned on the lower surface of the airbag plate 310 as the coupling portion 410 is coupled to the mounting portion 350, and on the whole, the head lining 400 may be mounted to the roof panel 200 while covering the roof panel 200.

The mounting portion 350 and the coupling portion 410 may be coupled to each other by various methods, and the head lining 400 may be coupled to the lower surface of the airbag plate 310 by adhesive bonding without the mounting portion 350 and the coupling portion 410. However, the adhesive bonding may cause the head lining 400 to be detached from the airbag plate 310. Therefore, it is preferable that the head lining 400 and the airbag plate 310 are coupled to each other by coupling of the mounting portion 350 and the coupling portion 410.

The coupling portion 410 of the head lining 400 is formed in a deformable form of a clip. When the coupling portion 410 is inserted into the mounting portion 350, the coupling portion 410 is locked to the mounting portion 350 so that reverse separation of the coupling portion 410 from the mounting portion 350 is prevented.

Referring to FIG. 5, the coupling portion 410 is formed such that a groove is formed downward from an upper surface of the coupling portion 410 and a section thereof expands as the coupling portion goes downward. In addition, the coupling portion 410 is elastically deformable, so the coupling portion 410 is inserted into the mounting portion 350 by elastic deformation. Furthermore, the coupling portion has a step at a lower portion thereof, so the coupling portion is locked to the mounting portion 350 and is prevented from separation after coupling, thereby being securely fixed to the mounting portion 350.

As the coupling portion 410 is coupled to the mounting portion 350 by locking, the coupling portion 410 may be easily coupled to the mounting portion 350 without a specific coupling process such as welding, so the manufacturing process may be simplified.

The coupling portion 410 and the mounting portion 350 may be embodied in various shapes, the shape of the coupling portion 410 and the mounting portion 350 of the present invention is only one of several embodiments. The coupling portion 410 and the mounting portion 350 are formed by various coupling methods to provide the effect of coupling the airbag plate 310 to the head lining 400.

An end of the head lining 400 is bent upward and covers an outer surface of the airbag module 300.

The head lining 400 is formed such that the end thereof is bent upward to cover the airbag module 300. The end of the head lining 400 is not separately coupled to the roof panel 200, so that the coupling process may be simplified. The head lining 400 allows the airbag module 300 to be invisible from the interior of the vehicle, the interior of the vehicle may be seen neatly.

The head lining 400 is configured to be deformed such that the end thereof moves downward due to the pressure of deployment of the airbag cushion 320 when the airbag cushion 320 is deployed. The airbag cushion 320 is configured to be deployed into a space between the end of the head lining 400 and the roof panel 200.

Referring to FIGS. 2 and 4, the airbag cushion 320 is deployed due to the gas generated from the inflator 330 when the airbag cushion 320 is deployed. By the pressure generated during the deployment of the airbag cushion 320, the head lining 400 is deformed such that the end of the head lining 400 moves downward. The airbag cushion 320 is deployed into a space between the roof panel 200 and the end of the head lining 400 to prevent the occupant from being injured due to the damaged sunroof 100.

Although the preferred embodiment of the present invention has been described for illustrative purposes, those skilled in the art will appreciate that various modifications, additions and substitutions are possible, without departing from the scope and spirit of the present invention as disclosed in the accompanying claims.

What is claimed is:

1. An airbag of a sunroof for a vehicle, the airbag comprising:
   a roof panel for a vehicle in which the sunroof is installed;
   an airbag module positioned at a lower portion of the roof panel and securely coupled to the roof panel, the airbag module comprising:
   an airbag cushion;
   an airbag plate coupled to a first side of the roof panel such that a gap is defined between the airbag plate and the roof panel,
      wherein the airbag cushion positioned within the gap and between the airbag plate and the roof panel, and
      wherein the airbag plate is configured to remain stationary during deployment of the airbag cushion;
   a bracket extending upward from the airbag plate and coupled to both the roof panel and the airbag plate; and
   a head lining positioned while being spaced downward from the roof panel, and fixed directly to a lower portion of the airbag module by a coupling portion.

2. The airbag of claim 1, wherein
   the airbag cushion is configured to be deployed toward a second side of the roof panel, thereby covering the sunroof during the deployment.

3. The airbag of claim 2, wherein the airbag module further comprises:
   an inflator positioned at a side, which is opposite to a deployment direction of the airbag cushion, in the gap between the airbag plate and the sunroof, the inflator being configured to inject gas into the airbag cushion to deploy the airbag cushion.

4. The airbag of claim 2, wherein the airbag module further comprises:
   a mounting portion mounted on a lower side of the airbag plate,
   wherein the head lining comprises:
   the coupling portion connected to an upper surface of the head lining and coupled to the mounting portion at a position corresponding to the mounting portion.

5. The airbag of claim 4, wherein the coupling portion of the head lining is formed in a deformable form of a clip, and when the coupling portion is inserted into the mounting portion, the coupling portion is locked to the mounting portion and the coupling portion is prevented from being separated from the mounting portion in a reverse direction.

6. The airbag of claim 2, wherein the head lining is configured to be deformed such that an end thereof moves downward due to deployment pressure generated when the airbag cushion is deployed, and the airbag cushion is configured to be deployed into a space between the end of the head lining and the roof panel.

7. The airbag of claim 1, wherein an end of the head lining is bent upward and covers an outer surface of the airbag module.

* * * * *